Figure 1:
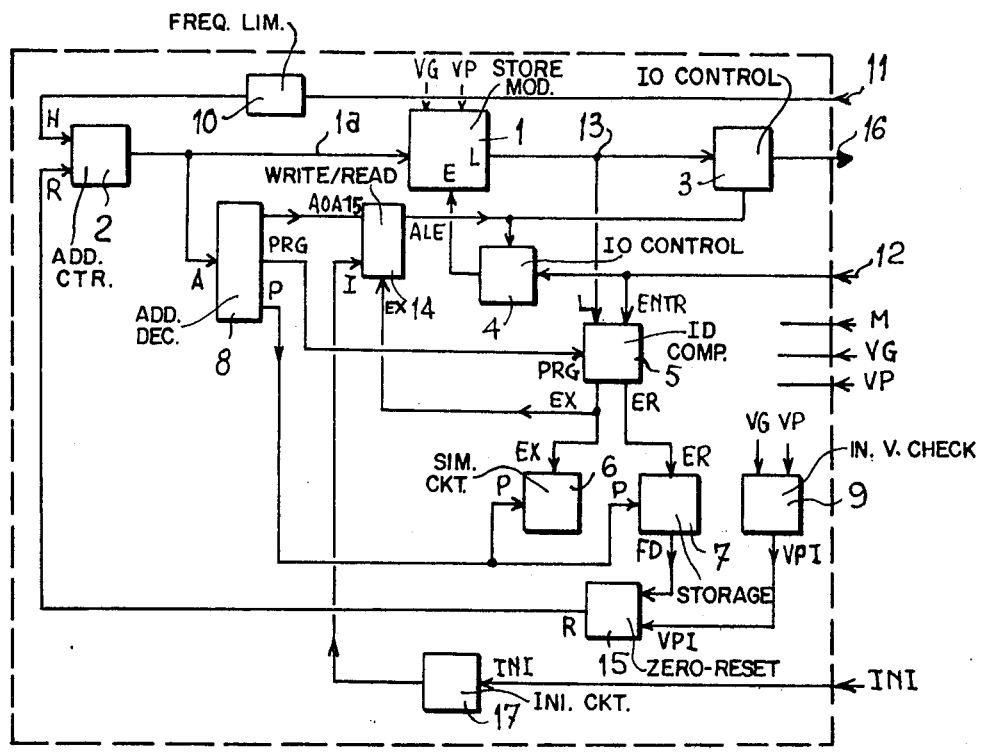

United States Patent [19]

Moreno

[11] 4,092,524
[45] May 30, 1978

[54] SYSTEMS FOR STORING AND TRANSFERRING DATA

[75] Inventor: Roland Moreno, Paris, France

[73] Assignee: Societe Internationale pour l'Innovation, France

[21] Appl. No.: 686,095

[22] Filed: May 13, 1976

[30] Foreign Application Priority Data

May 13, 1975 France ............................. 75 14808

[51] Int. Cl.² ...................... G06K 5/00; G06K 19/06; G11C 15/04
[52] U.S. Cl. .................................... 235/419; 235/487
[58] Field of Search .................. 235/61.7 B, 61.7 R, 235/61.8 A; 340/149 A, 173 R

[56] References Cited

U.S. PATENT DOCUMENTS

| | | | |
|---|---|---|---|
| 3,772,659 | 11/1973 | De Vries | 340/173 R |
| 3,868,057 | 2/1975 | Chavez | 235/61.7 B |
| 3,873,019 | 3/1975 | Holcomb | 235/61.8 A |
| 3,881,175 | 4/1975 | Wanlass | 340/173 R |
| 3,906,460 | 9/1975 | Halpern | 235/61.7 B |
| 3,934,122 | 1/1976 | Riccitelli | 235/61.7 B |

*Primary Examiner*—Daryl W. Cook
*Attorney, Agent, or Firm*—Weiser, Stapler & Spivak

[57] ABSTRACT

A portable independent electronic object designed for storing and transferring data confidentially intended for being coupled to a data transfer device; the said portable object comprising, at least one store module intended for the storage of data in an easily portable form, containing enabling data, coupling means accessible from outside the portable object, enabling the said portable object to be coupled temporarily with the said transfer device, circuits for control of the store, interconnected between the coupling means and the store; the said store and the control circuits being produced in the form of logical microstructures; an indentification comparator connected to the store and to the coupling means, intended for comparing the enabling data contained in the store with a confidential code supplied by the rightful owner of the portable object and introduced into the portable object by way of the said transfer device; the said portable object being characterized in that it includes in addition, a circuit for storage of the errors in confidential code, associated with the identification comparator, intended to keep track permanently of the errors in confidential code, the said storage circuit comprising at least one store element composed of a permanent store.

27 Claims, 5 Drawing Figures

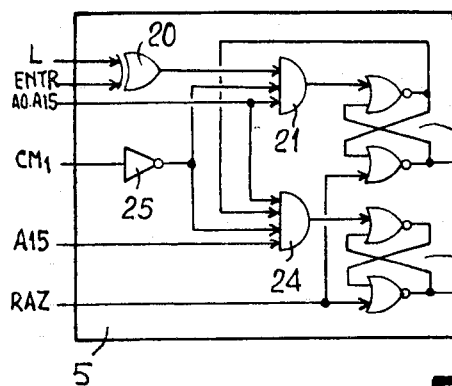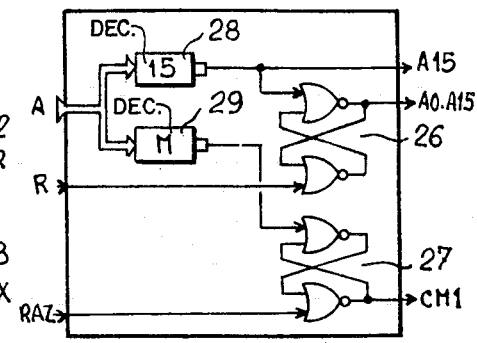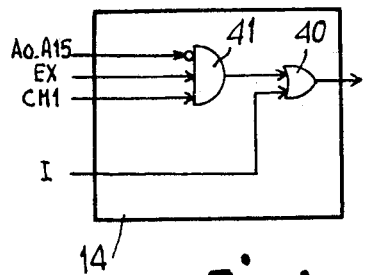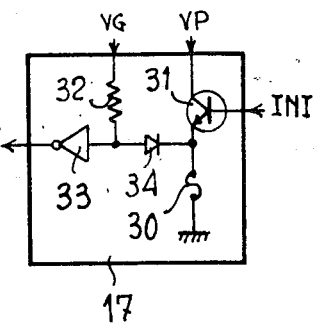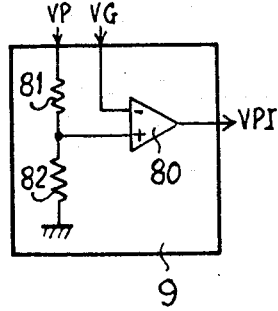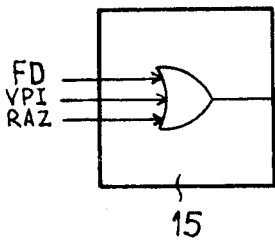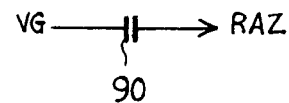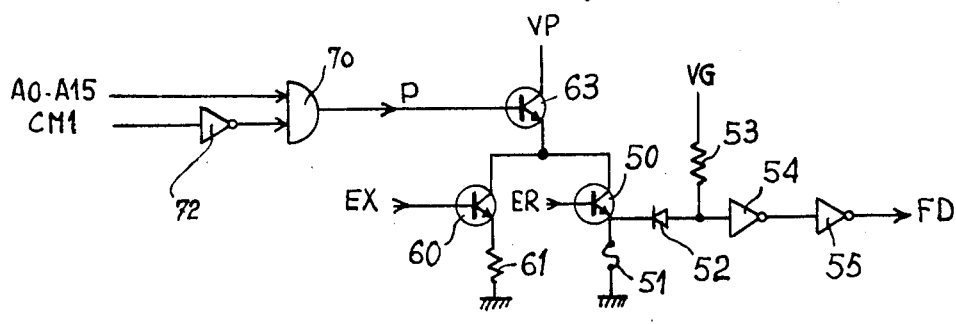

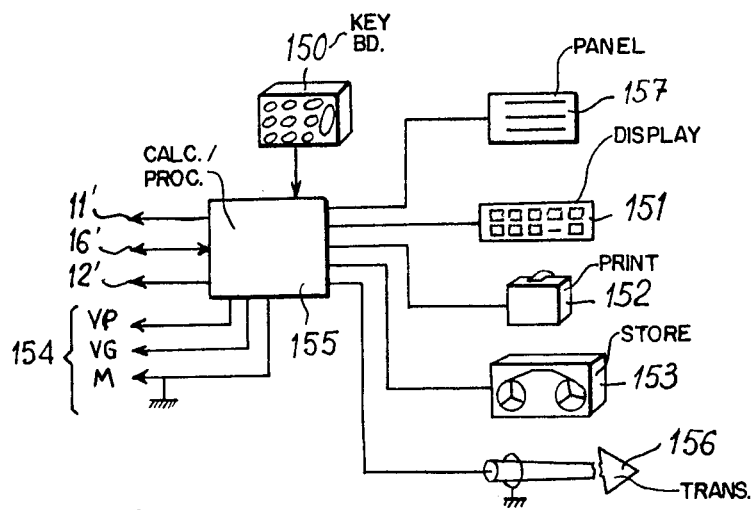
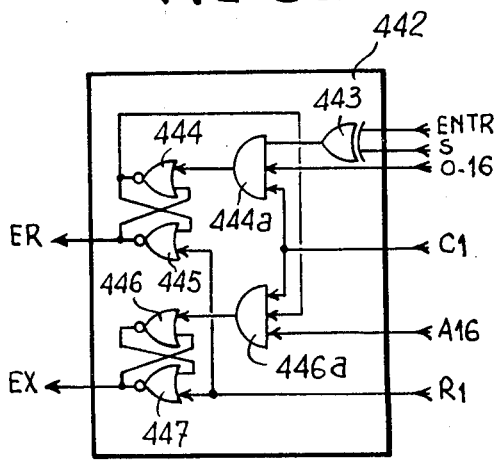 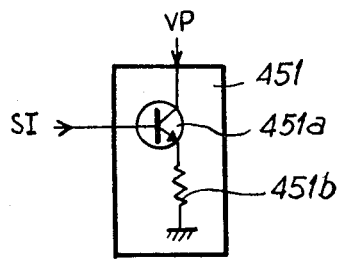
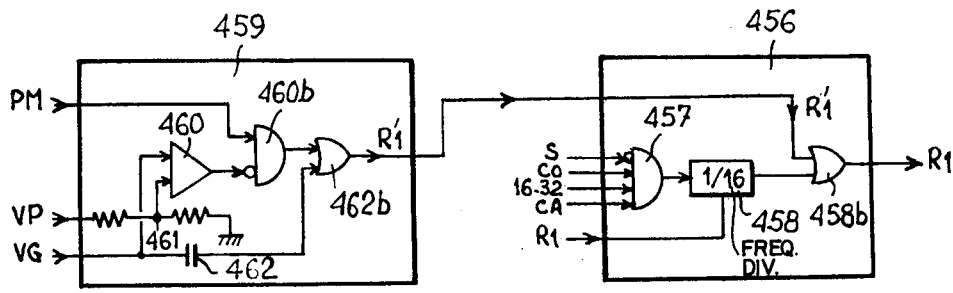

SYSTEMS FOR STORING AND TRANSFERRING DATA

The present invention refers to systems of storing and transferring data confidentially and personally by means of portable independent electronic objects; it refers more particularly to these portable electronic objects.

In the U.S. application Ser. No. 560,873, U.S. Pat. No. 3,971,916, filed on the Mar. 21, 1975 by the Applicants a system was described which is composed:
on the one hand of at least one portable independent electronic object,
on the other hand of at least one transfer device.
The portable object comprises:
at least one store intended for the storage of data in an easily portable form containing enabling data,
coupling means accessible from outside the portable object, enabling the said portable object to be coupled temporarily with the said transfer device,
circuits for control of the store, interconnected between the coupling means and the store.

The store and the control circuits of the portable object are produced in the form of logical microstructures.

The transfer device includes means of transfer of data into or out of the portable object; it includes in addition an identification comparator which compares the enabling data contained in the store with a confidential item of data introduced into the transfer device by the bearer of the portable object.

These systems may be employed especially in banks or sales points for distributing banknotes or for allowing a transaction between, for example, a tradesman and a buyer. In the latter case the buyer has available a portable object in the form of a payment card. In order to settle the amount of his purchases he couples his payment card to the transfer device which is, for example, associated with the tradesman's cash-register.

In the electronic stores on the card are recorded
a confidential enabling code enabling the identity of the owner of the payment card to be identified,
the identity of the client (his bank account number, the name of the client),
the succession of debit and credit operations carried out by the transfer device.

The confidential enabling code is, for example, recorded in the payment card in the form of a word of several bits. The user of the payment card who is the only one to know the confidential number corresponding with the enabling data contained in the card introduces (for example, by means of a keyboard) this confidential number into the transfer device. The identification comparator contained in this transfer device compares this confidential code number with the enabling data contained in the payment card, thus authenticating the identity of the user of the card prior to the debit and credit operations. In the case where the confidential code number introduced by the bearer of the card into the transfer device does not correspond with the word of several bits recorded in the payment card the identification comparator interrupts the continuation of the operations (debit, credit, etc.) being carried out by the transfer device. One is thus assured that the transaction really concerns the regular holder of the payment card.

However, elaborate though this system is, it exhibits one disadvantage which it is desirable to eliminate. That is, a swindler who is a specialist in microelectronics has the possibility of achieving a simplified version of the transfer device, designed to apply voltage to the portable object and depending on the wish of the Swindler, to read or write information in the store of the portable object. Thus, for example, in the case of a stolen payment card the swindler does not need to know the confidential enabling code to read the contents of the store of the portable object or to modify it.

In the co-pending Application filed on the same day at the same time with the title: "System of transferring and storing data personally and confidentially by means of portable independent electronic objects", a portable object was described which to a large extent eliminates the disadvantages which have just been explained. This portable object includes an identification comparator connected with the store and the coupling means, which is intended to compare the enabling data contained in the store with a confidential item of data introduced into the transfer device by the bearer of the portable object.

Thanks to this identification comparator located inside the portable object the swindler no longer has the possibility of reading or modifying the contents of the portable object which he has found or stolen. That is, he must prior to any operation provide the confidential code and introduce it into the portable object by means of the transfer device, which for him is impossible since only the regular holder of the portable object knows the confidential code.

This portable object is particularly well adapted to combat attempts at fraud when the enabling data consist of a word of great length composed of several digits. That is, even if the swindler puts to work a programmed automatic equipment to apply to the portable object a combinative series of every possible confidential code he will need a considerable time for discovering the enabling data contained in the card. For example, in the case of a confidential code of 50 bits he will need 230 years if he has available an automatic equipment having a clock frequency of 1 MHz.

However, a long confidential code compels users in normal operation to compose on a numerical keyboard a large number of digits (13 in the quoted example) or else on an alphabetical keyboard an equally long succession of letters (10 in the quoted example).

If in order to facilitate the employment of the portable object the number of digits in the confidential code is reduced one then makes again possible, fraud by means of a programmed automatic equipment. For example, in the case of a confidential code of four digits (16 bits in BCD code) it will be sufficient for the swindler to generate in the worst case a series of 10,000 confidential codes of 16 bits, or 160000 bits; if he has available an automatic equipment operating at the frequency of 1 MHz a time of operation of 0.16 s is sufficient. Similarly, in the case of a confidential code of seven letters the time necessary to the automatic equipment will be of the order of 78 hours, which is still suitable to a swindler.

The aim of the present invention is to correct this disadvantage and to avoid a particularly well equipped and informed swindler being able with impunity to subject a found or stolen portable object to a series of ultra-rapid systematic tests with every possible confidential code until the access gates to the store of the portable object open.

In the HALPERN U.S. Pat. No. 3,906,460 a portable object is described which includes a store for counting up the errors in confidential codes in order to invalidate the portable object as soon as a certain number of errors have been committed but it is important to underline that this store of a special type needs to be fed continuously by a source of electrical energy in order that the number of errors is kept recorded. This store which counts up the errors in confidential codes therefore exhibits at least two major disadvantages:

on the one hand it imposes a considerable encumbrance upon the portable object by a high cost price since a self-contained source of energy must be provided; now, one knows that the development of these systems of data transfer can only be contemplated in a practical way if one succeeds in achieving portable objects which are light, not very bulky, and cheap;

on the other hand, the storage of errors in confidential codes is dependent upon a source of energy capable of accidental failure and above all of deliberate interruption on the part of a swindler; now, one knows that the problem of fraud is the essential problem which the present invention has in view.

In the GRETAG U.S. Pat. No. 3,806,874, a system of data transfer is described which includes an identification circuit; to be sure, this identification circuit detects the errors in confidential codes but it does not include any complementary means of prohibiting the setting to work of an automatic equipment which generates in series a number of confidential codes; the teaching of the GRETAG patent is not different on this point from the previously quoted application Ser. No. 560,873. To be sure, the GRETAG identification system can because of its complexity dissuade an attempt at fraud by means of an automatic equipment, but:

on the one hand nothing prevents a swindler from attempting to frustrate this complexity, on the other hand this dissuasion is obtained only at the price of a costly complication of the identification circuit in relation to a necessary secret (and hence vulnerable) piece of information contained in the transfer device.

In the NAGATA U.S. Pat. No. 3,731,076, a system of data transfer is described which includes an identification circuit and in addition means of counting and storing the errors in confidential codes in order to invalidate the portable object as soon as a certain number of errors have been committed. Nevertheless it is important to observe that these identification circuits and these means of counting the errors in confidential codes are contained in the transfer device; the NAGATA system will therefore exhibit the disadvantages described above in analysing the aforesaid application Ser. No. 560,873, and which are connected with the possibility of a swindler achieving a transfer device which accepts any portable object presented to it. Furthermore it should be underlined that the construction of the portable object is not described in the NAGATA patent. Now, as will be disclosed below, the construction of the components of the portable element contributes in an important way to the solution of the problem presented (that is, depending upon their construction, it is more or less difficult to defraud the contents of the portable object); so that for this other reason NAGATA cannot claim:

on the one hand, to be aiming at the same objectives as those attained by the invention, on the other hand, to teach means put into effect by the same device as that of the invention, namely, a portable object.

In order to attain the target aimed at by the invention (that is to say, to avoid a well equipped and informed swindler being able with impunity to subject a found or stolen portable object to a series of ultra-rapid systematic tests of every possible confidential code), the portable object intended to be coupled to a transfer device comprises:

at least one store module intended for the storage of data in an easily portable form, containing enabling data, coupling means accessible from outside the portable object, enabling the said portable object to be coupled temporarily with the said transfer device, circuits for control of the store, interconnected between the coupling means and the store;

an identification comparator connected to the store and to the coupling means, intended for comparing the enabling data contained in the store with a confidential code supplied by the rightful owner of the portable object and introduced into the portable object by way of the said transfer device;

the said store module and the control circuits and the comparator being produced in the form of logical microstructures.

the said portable object being characterized in that it includes in addition:

In addition, in accordance with a main characteristic of the present invention it includes:

a circuit for storage of the errors in confidential code, associated with the identification comparator, comprising at least one store element composed of a permanent (unfed) store, intended permanently to keep track of the invalidations.

Let us state clearly here that by "permanent store" it is intended to designate a store which keeps the information recorded without consumption of energy.

Thanks to this storage circuit it is possible either definitely to prohibit any use of the portable object, or to prohibit writing and/or reading of the contents of the portable object, or to indicate in a simple manner (a loud buzz, etc.) that the portable object has formed the subject of an attempt at fraud; for that purpose it is sufficient to associate it with suitable inhibitor circuits especially, for example, a zero reset circuit or a circuit to prohibit writing, which systematically inhibit the operation of the electronic circuits to which they are connected (or which actuate visualizer screens provided for this purpose in the transfer device).

Moreover the fact that the store element is composed of a permanent (unfed) store offers the advantage:

on the one hand, of simplifying the production of the portable object and reducing its bulk, on the other hand, of avoiding any attempt at fraud which would have the effect of affecting the energy feed circuit of the store element.

This store element may be of destructible type, especially a fuse, which enables keeping track indefinitely in a reliable and irreversible manner, of the errors in confidential code. In this case, in particular, in order to restrict the attempts at fraud the portable object comprises preferably in addition a simulator circuit connected in parallel with the storage circuit and/or a circuit for checking the supply voltage in the storage circuit and possibly in addition a frequency limiter connected in series with the addressing counter in the store module. These circuits and these members prevent the swindler from disturbing the operation of the storage circuit, either by reducing the supply voltage or by interrupting the process of destruction before it has started or completely finished.

It is equally possible to employ a non-destructible store element (MNOS, ovonic, FAMOS) but the perenniality of the storage will in this case have a less absolute character, above all in the case of FAMOS technology where exposure to a source of ultraviolet rays or X-rays enables the store to be erased. In order to frustrate an attempt at fraud it may be provided by construction that the store element contains originally 1 bit read in and that its contents should never be zero. So, as the FAMOS stores can only be erased as a whole it becomes pointless to attempt to erase the store element.

Preferably and in accordance with a complementary characteristic of the invention the storage circuit includes a plurabity of store elements, which enables keeping track of a number of errors committed. In this case the storage circuit is in particular associated with a counting and inhibition (especially zero-reset) circuit which counts the number of errors in confidential code committed and recorded in the storage circuit and which delivers an inhibitor (zero-reset, for example) signal when the number of errors committed reaches a predetermined threshold. Thanks to this arrangement the portable object gains in flexibility of use; the user has in fact the possibility of committing a small number of involuntary errors in confidential code without seeing himself automatically penalized by the definite destruction or invalidation of his card.

Preferably and in accordance with a complementary characteristic of the invention the store element or elements of the storage circuit consist of store elements proper in the store module. Such an arrangement enables the technological production of the portable object to be simplified by employing only one type of store module of conventional design mass produced.

In order to enable the initial reading-in of the enabling data into the store module the portable object has in addition preferably an initialization circuit for the use of the manufacturer; this initialization circuit inhibits the operation of the electronic circuits of the portable object especially that of the storage circuit by means of the member for control of authorization of writing and/or reading; preferably this initialization circuit comprises a store element, especially a permanent store (for example, MNOS, ovonic, FAMOS), in particular a destructible store (for example with a fuse) intended to be destroyed by the manufacturer when he wishes to put into service the circuits for storage of the errors in confidential code. The store element of this initialization circuit consists favourably of one of the store elements of the store module.

Figure 3:
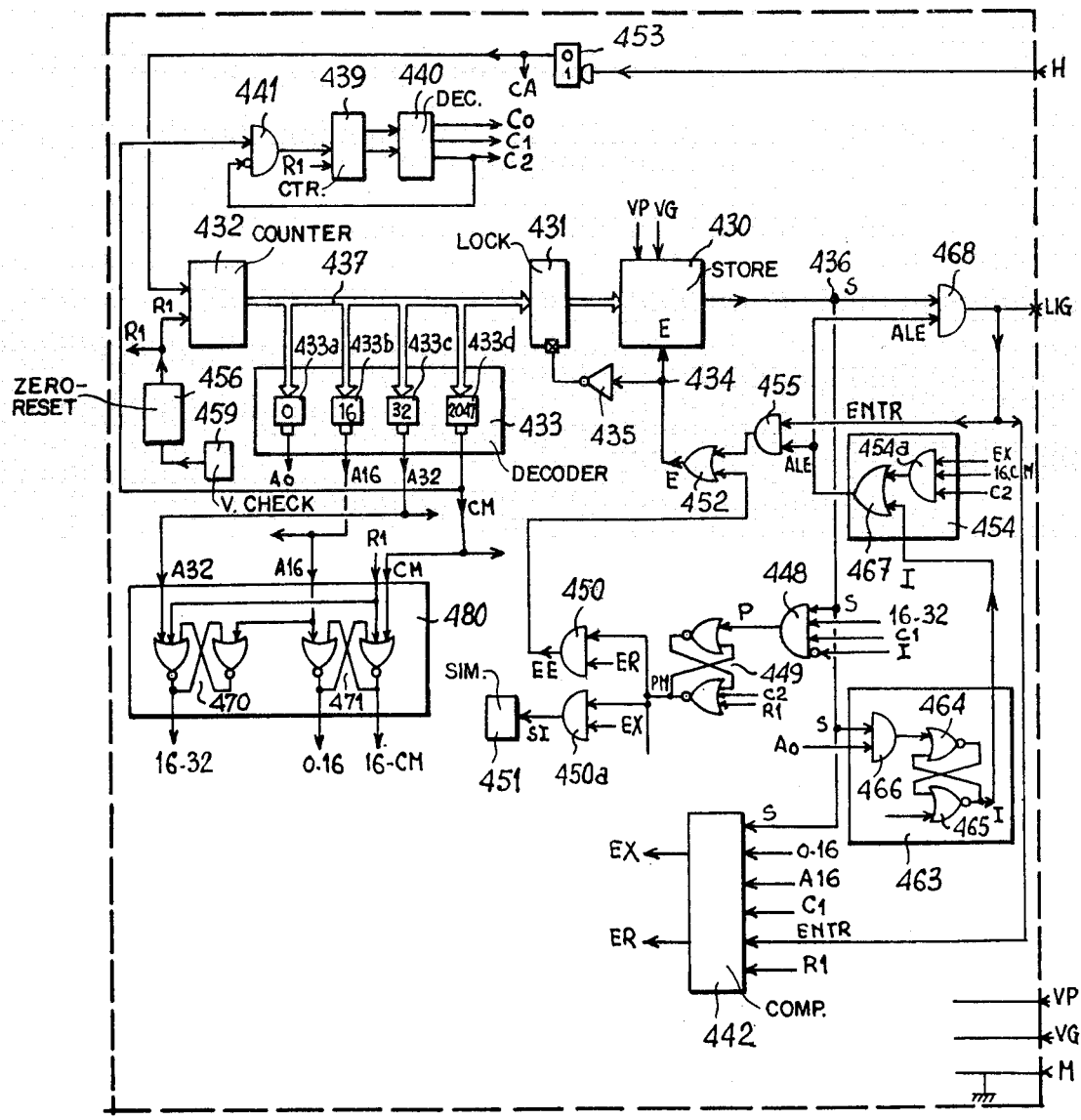

Some variant embodiments will now be described, of a portable electronic object in accordance with the invention, by referring to the FIGURES which illustrate:

FIG. 1—a synoptic view of the logic diagram of the electronic circuits of a first variant embodiment including a circuit for storage of the errors in confidential code with only one store element;

FIGS. 1a to 1i—detail partial views of the electronic circuits of a second variant embodiment of a portable electronic object comprising a circuit for storage of the errors in confidential code with only one store element;

FIG. 2—a synoptic view of a transfer device intended to be associated with the portable objects in accordance with the invention;

FIG. 3—a detailed view of the electronic circuits of a third variant embodiment of a portable electronic object comprising a circuit for storage of the errors in confidential code including a plurality of store elements associated with an error counter;

FIGS. 3a,3b,3c—respectively detailed views of the identification comparator, of the simulation circuits, of the zero-reset circuits, of the circuit for checking the supply voltage, composing the variant embodiment illustrated in FIG. 3.

The electronic circuits in the embodiments of the portable article described hereinafter are for use in banking and are therefore incorporated in inaccessible manner in portable articles, which are inter alia in the form of a flat rectangular card. They are incorporated in inaccessible manner, i.e. the electronic circuits cannot be reached without destroying them. This result can be obtained, more particularly, by constructing them in the form of logic microstructures (integrated circuits) and embedding them in an opaque plastic resin, but other mechanical solutions can be used. In all the drawings illustrating the portable article (or card) a borken line denotes the casing surrounding those parts of the circuits which are electrically or optically inaccessible from the exterior.

In order to simplify the description of the electronic circuits as far as possible, the supply circuits etc. are omitted, leaving only the necessary functional circuits. With regard, however, to the coupling means, the necessary supply connections between the card and the external transfer device are indicated by the references VP, VG and earth M, which respectively denote the source of write-in voltage, the general supply source for the logic circuits and the zero-volts line.

The coupling means (bars, combs, etc) are the only element giving electrical or optical access to the electronic components inside the card.

The monolithic read-only stores comprising the store modules, in these embodiments can be various natures, inter alia programmable or re-programmable. Stores of this kind do not need any energy for storing information. On the other hand, a considerable amount of energy (a number of instantaneous watts) are generally needed for writing in information; consequently, the manufacturers guarantee an extremely long storage life, of the order of several decades in the case of re-programmable stores. The following references for this type of stores may be cited:

INTEL 1702 and NATIONAL SEMI-CONDUCTOR 5203; these stores can be erased by exposure to an ultra-violet ray or X-ray source;

HARRIS 7620, MONOLITHIC MEMORIES 6340, TEXAS INSTRUMENTS 74 S 387, INTERSIL 5604; these stores are non-erasable (destructible) and are the kind involving fuses or the breakdown of functions.

4096-Bit capacitances are conventionally manufactured by some designers, inter alia by the (erasable) MOS store technique. Thus, modern methods of interconnecting integrated circuit pellets can be used at low expense to construct a 16 k-bit or 32 k-bit store unit (4 or 8 pellets) on an area of a few tens of $mm^2$, including the special circuits according to the invention, so that the unit can be included in a card having the following dimensions: 2 × 60 × 80 mm.

These semi-conductor monolithic read-only stores have appreciable advantages over other read-only stores such as magnetic cassettes and flexible discs. They are more reliable, smaller, do not require mechanical movement for reading the information, are insensitive to magnetic fields, and are difficult to imitate or tamper with (since a swindler has to use complex electronic means in order to modify the state of a semi-conductor read-only store). Consequently, the aforementioned semi-conductor read-only stores are particularly suitable, in preference to others for use in storage systems according to the invention, more particularly in applications of the systems relating to banks.

FIG. 1 will now be described, which illustrates in block form a portable circuit capable of keeping track in store, of the errors in confidential code.

The portable circuit comprises the following elements:

(a) A programmable store module 1 organized in m.n words of 1 bit (for example, 2048 words of 1 bit) at logical level 1 in the virgin state; this store module includes its own read-in circuits so that a simple logical order applied to the input E to the module commands the reading-in of the bit being addressed;

(b) An addressing counter 2 connected in series thanks to the addressing circuit 1a, with the store module 1; the clock input H to this counter is connected to the input 11 to the portable object by way of a frequency limiter 10; this input to the portable object is intended to receive the clock pulses proceeding from the transfer device;

(c) An identification comparator 5 which compares the data introduced into the portable object through the input 12 with the enabling data contained in the store module; this identification comparator is connected by its inputs L and ENTR respectively to the output 13 from the store module and to the input 12 to the portable object; (in addition, by its input (PRG) it is connected to the output (PRG) from an address decoder 8);

(d) An address decoder 8 connected in parallel by its input A to the addressing lead 1a to the store module;

(e) Members 3, 4 for control of the circuits for access (input and/or output) to the store; the control member 4 is connected in series between the input 12 to the portable object and the input E to the store; the control member 3 is connected in series between the output 16 from the portable object and the output 13 from the store module; these control members constituted especially by AND-gates are controlled by a member for control of authorization of writing and/or reading 14;

(f) A member for control of authorization of writing and/or reading 14; this member is interconnected with the address decoder 8, with the comparator 5 by its input EX, with an initialization circuit 17 which will be described below, by its input i; the output ALE from this member for control of authorization of writing and/or reading is connected with the members 3 and 4 for control of the circuits for access (input and/or output) to the store;

(g) A storage circuit 7 intended to keep track in store of the errors in confidential code detected by the identification comparator 5; this storage circuit is connected to the identification comparator 5 which actuates it by an input marked ER; it is likewise connected by its input marked P to the output P from the address decoder 8; its output FD is connected to the input FD to a control member 15 for the reset to zero;

(h) A zero-reset control circuit 15, especially an OR-gate; the input VPI to this circuit is connected to the output VPI from a member for checking the writing voltage 9; the output R from the circuit 15 is connected to the input marked R to the addressing counter 2;

(i) A simulation circuit 6 the input EX to which is connected to the output EX from the identification comparator 5; it is likewise connected by its input P to the output P from the address decoder 8;

(j) A circuit 9 for checking the read-in voltage; this circuit is connected to the inputs VP and VG to the portable object;

(k) A frequency limiter 10 connected in series with the input 11 to the portable object;

(l) An initialization circuit 17; this circuit is connected by its input INI to the input INI to the portable object; its output I is connected to the input I to the member 14 for authorization of writing and/or reading.

The enabling data stored in the first addresses of the store are compared in the member 5 with the confidential code tapped out on the key-board of the transfer device by the user (leads 13 and 12 respectively).

In the event of negative comparison an order is sent by the comparator to the storage circuit 7; consequently the zero-reset input R to the addressing counter 2 is activated permanently; the result is that the portable circuit is definitely out of use.

The circuit 9 for checking the writing voltage and the zero-reset control circuit 15 are not fundamentally indispensable and may in certain variant embodiments be eliminated; in this case the output FD from the storage circuit 7 is connected directly to the input R to the addressing counter 2.

The circuit 9 for checking the writing voltage has the object of preventing a possible swindler from attempting not to supply to the portable circuit the voltage necessary to setting the storage circuit 7 to work; such a problem is posed when the storage circuit is composed of a destructible element, especially a fuse; in this case it is necessary to provide a supply VP (especially a voltage VP) suitable for destroying the fuse; in fact a swindler theoretically has the possibility of employing a slave programmable supply enabling him to interrupt (by reducing the supply voltage VP) the process of destruction of the element in the storage circuit 7 as soon as a call for current on the supply line at the voltage VP is detected.

Similarly the simulation circuit 6 is not fundamentally indispensible; its function is to frustrate certain attempts at fraud which may be contemplated especially in the particular case where the storage circuit consumes a certain amount of energy; this is the case, for example, when the storage circuit is composed of a destructible element such as a fuse. The circuit 6 simulates electrically in the case of positive comparison—that is to say, in the case where the confidential code corresponds with the enabling data—the destruction of the storage element. In this way, if the swindler is watching the current consumed by the portable object in the supply lead at the voltage VP he cannot deduce any conclusion from it and must wait for the end of this call for current and the coming out or not coming out of information through the control member 3, in order to know if the confidential code tested is correct or incorrect.

The end-of-storage or end-of-simulation order is given by the address decoder 8 (output P from the decoder, inputs P to the storage and simulation circuits) when it detects the state of maximum counting by the counter.

The frequence limiter 10 is not a fundamentally indispensable member either; its role is to impose a ceiling on the clock frequency employed by the transfer device, so a minimum time is guaranteed between the start and the finish of the storage process. This minimum time D may be calculated by the formula:

$$D = (mm - cc) \times (1/Fmax)$$

in which:
mm represents the capacity of the counter 2 in bits;
cc represents the format of the confidential code in bits;
Fmax represents the maximum clock frequency at the input 11 to the portable object in megahertz;
D represents the minimum time in microseconds.

Hence the frequency limiter 10 compels the swindler to wait for a minimum time for the response of the portable object to a given confidential code before try it with another; this minimum time is fixed by manufacture so as to enable the storage cycle (for destruction of the fuse) to develop normally; thus the swindler has no possibility of frustrating the operation of the storage circuit by accelerating the process of comparison.

Thus, thanks to this assembly of means, any attempt at fraud will betray itself either by storage of the attempt at fraud and putting of the portable object out of use, or will be without effect (if the source of supply voltage is incorrect, or if the clock frequency is excessive).

The initialization circuit 17, especially composed of a destructible element such as a fuse, enables writing of the enabling data before putting the portable object into service; before de-activation of the initialization circuit (before destruction of the fuse) the member 14 for control of authorization of writing and/or reading is fixed in the authorization position which enables the manufacturer to introduce the enabling data into the store in the portable object; after writing, the manufacturer de-activates the initialization member (destroys the fuse) which becomes without effect upon the member 14 for control of authorization.

FIG. 2 will now be described, which illustrates in block form an embodiment of the transfer device capable of cooperating with the portable object in accordance with the invention, which has been described by referring to FIG. 1.

The transfer device comprises the following elements:
(a) A bundle of connectors intended to enable coupling of the portable object ot the transfer device (154: supply to the portable circuit; 12', 16', 11': exchange of data);
(b) A calculating and processing member 155, controlling the whole of the transaction processes;
(c) A keyboard 150 enabling the user to introduce data (confidential enabling code, values, etc.);
(d) Output members: a display 151 and a printer 152, enabling the user to be informed, for example, about the contents of the portable object;
 a store 153, for example, of programmable semiconductor type, or magnetic cassette type;
 a panel of luminous instructions 157 enabling the user to be guided in the sequence of the operations;
(e) A possible connection to a transmission line 156 enabling, for example, exchange of data in real-time with a central computer.

Detailed variant embodiments of the members composing a portable object of the type described will now be described by referring to FIG. 1.

Figure 1A:
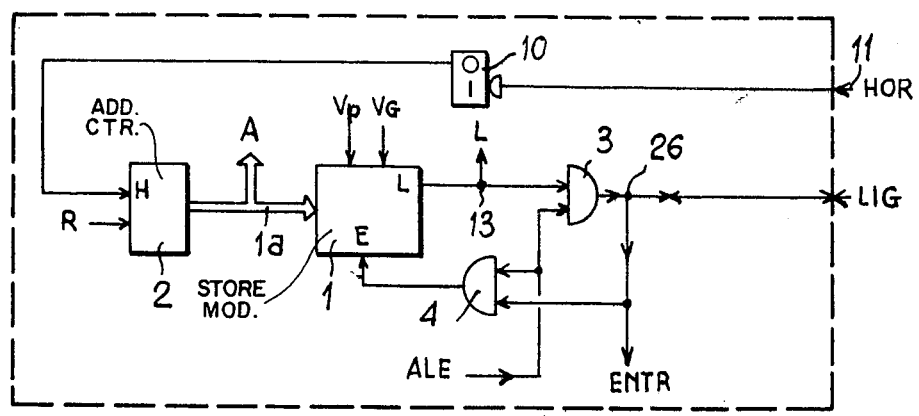

In FIG. 1a is illustrated a variant embodiment of the control members 3 and 4 and their interconnections with the store 1. In this FIG. 1a may be recognized the store 1, the addressing counter 2, the frequency limiter 10 and the clock input 11 to the portable object. In the case of this variant embodiment the control members 3 and 4 consist of AND-gates actuated by the output ALE from the member 14 for control of authorization of writing and/or reading.

Likewise in the case of this variant embodiment the inputs 12 and 16 to the portable object are merged into one sole input LIG. That is possible because the gate 3 is of the open collector type; consequently a single lead may be employed for the input of information into the portable object and their output.

The frequency limiter 10 is composed of a monostable of retriggerable type. This monostable delivers a pulse of given width, for example, 1 microsecond across each positive front from the clock connected to the input 11 to the portable object; the result is that the maximum frequency of use is limited at least to 1 MHz; the time for destruction may therefore be at a maximum $(2048-16) \times (1/1) = 2033\mu s$ or substantially 2 ms. If this time is judged to be insufficient this monostable may be replaced by a bi-triggerable monostable (by positive fronts and by negative fronts) which doubles this time and brings it to 4 ms. In addition one can employ in combination with this monostable a counter of, for example, four stages enabling the time to be multiplied by 16 and brought to 64 ms; this time is in general sufficient for destroying the majority of known destructible elements (certain fuses need only 100 $\mu s$ for their destruction).

In FIG. 1b is illustrated a variant embodiment of the comparator 5 intended more particularly to be associated with the variant embodiment of the control members 3 and 4 described above. This comparator 5 comprises a sequential comparator consisting of an EXCLUSIVE-OR-gate 20 connected to the output L (point 13) from the store and to the input LIG (point 26) to the portable object by its input marked ENTR; it comprises two AND-gates 21 and 24 as well as an inverter limiting the period of comparison to the first cycle of the addressing counter 2.

The AND-gates 21, 24 actuate two flip-flops 22, 23 the outputs from which are respectively marked ER, EX. Two decoded signals leave the comparator: one by the output ER when the confidential code is incorrect, the other by the output EX when the confidential code is correct.

The comparator is controlled by the address decoder 8 which will be described below in reference to FIG. 1c; the inputs A0–A15, CM1, A15 to the comparator are connected to the corresponding outputs A0–A15, CM1, A15 of the address decoder 8. An input RAZ connected to the output RAZ from the circuit shown in FIG. 1h enables the initial and sole positioning of the comparator.

In FIG. 1c is represented a variant embodiment of the address decoder 8 more particularly intended to be associated with the comparator described in reference to FIG. 1b. The address decoder 8 comprises two flip-flops 26–27 actuated by two decoder gates 28–29 connected to the 11 output weights from the addressing counter 2 by its input A; one of the decoder gates 28 detects State No. 15 of the counter corresponding with the address of the last bit composing the enabling data; the other decoder gate 29 detects State No. 2047 corresponding with the address of the last bit in the store (maximum counting of the counter). The output marked A15 is activated when the counter is in State No. 15; the output marked A0–A15 is activated for all the useful addresses in the store, that is to say, for all the addresses other than those corresponding with the enabling data. The output marked CM1 is established in a stable fashion at the logical level 1 when the counter ends its first cycle; this output CM1 is connected to the input CM1 to the storage and simulation circuits (which will be described below; FIG. 1i) and to the member 14 for control of authorization of writing and/or reading (which will be described below; FIG. 1d). These interconnections on the one hand enable operation of the storage (or simulation) circuit to be interrupted, and on the other hand any writing and/or reading operation to be prohibited as long as a certain time has not elapsed, that is to say, as long as the storage (or simulation) processes have not had time to occur normally.

In FIG. 1d is illustrated a variant embodiment of the member 14 for control of authorization of writing and/or reading, more particularly intended to be associated with the decoder 8. The member 14 for control of authorization comprises an AND-gate 41 of which the inputs marked A0–A15, CM1, EX are respectively connected to the outputs A0–A15 and CM1 from the decoder member 8 (FIG. 1c) and to the output EX from the comparator 5 (FIG. 1b). The input A0–A15 to the gate 41 guarantees the irreversible and inviolable character of the enabling data contained in the store of the portable object; in fact, thanks to this input the AND-gate is automatically closed for the addresses of the store which contain the enabling data. The input EX to the AND-gate 41 lays it down that the confidential code be correct, that is to say, that it correspond with the enabling data, for authorizing opening of the AND-gate 41. The AND-gate 41 is connected in series with an OR-gate 40 the other input to which, marked I, is connected to the initialization circuit (which will be described below: FIG. 1e); the output ALE from the OR-gate 40 is connected to the inputs ALE to the members 34 for control of writing and/or reading (FIG. 1a).

In FIG. 1e is illustrated a variant embodiment of the initialization circuit 17 more particularly intended to be associated with the member 14 for control of authorization of writing. The circuit 17 comprises a fuse 30 mounted in series with a current-interruptor transistor 31, the input VP to which is connected to the corresponding feed VP. An inverter 33 and a resistor 32 connected to the general positive source VG enable destruction of the fuse 30 to be shown by a low logical level at the output I. As long as the fuse 30 is not destroyed the OR-gate 40 (FIG. 1d) is forced by its input I to the logical level 1 which therefore authorizes reading and/or writing independently of the address. The order for destruction of the fuse 30 is given by the manufacturer over the input INI to the transistor 31, which is connected to the corresponding input INI to the portable object (FIG. 1); a diode 34 enables protection of the inverter during the operation of destruction of the fuse.

As soon as the fuse 30 is destroyed it becomes indispensable to know the confidential enabling code in order to have access to the information contained in the store of the portable object and to write in it new data; the wholly secret and personal character of the portable object is thus guaranteed.

In FIG. 1f is illustrated a variant embodiment of the circuit 9 for checking the writing voltage, more particularly intended to be employed when the voltage VP necessary for destroying the destructible element (the fuse) in the storage circuit 7 is different from the general supply voltage VG. The circuit 9 for checking the writing voltage is composed of an analogue comparator 80 connected to the general positive source VG and to the divider network 81–82 connected to the supply VP. A positive level is established at the output VPI from this analogue comparator 80 in the event of inadequacy of the voltage VP with respect to the voltage VG. The output VPI from the comparator 80 is connected to the input VPI to the zero-reset circuit 15 (which will be described below: FIG. 1g).

In FIG. 1g is illustrated a variant embodiment of the zero-reset control circuit 15 more particularly intended to be associated with the members and circuits described in reference to the preceding Figures. The zero-reset control circuit 15 is composed of an OR-gate the inputs to which are marked respectively FD, VPI, RAZ and the output from which is marked R. The input marked VPI is connected to the output VPI from the circuit 9 for checking the writing voltage; the results is that inadequacy of the voltage VP with respect to the voltage VG will bring about opening of the OR-gate and the appearance of a logical level 1 at the output marked R; as this output marked R is connected to the zero-reset input R to the addressing counter 2, the result is resetting to zero of the addressing counter. The output R from the OR-gate is likewise connected to the input R to the flip-flop 26 (FIG. 1c) bringing about its reset to one. A capacitor 90 (FIG. 1h) connected to the general voltage source VG and connected by its output RAZ to the inputs RAZ to the zero-reset control circuit 15, the flip-flop 27 of the decoder member 8 (FIG. 1c), and the flip-flops 22, 23 of the comparator 5 (FIG. 1b) enables initial setting to zero of the electronic circuits of the portable object thanks to the single pulse that it emits at the time of being putting under voltage (that is to say, when the portable object is coupled to the transfer device: FIG. 2).

In FIG. 1i is illustrated a variant embodiment of the storage 7 and simulation 6 circuits more particularly intended to be associated with the comparator 5 and the decoder member 8 respectively illustrated in FIGS. 1b and 1c.

The storage circuit 7 is composed of a destructible fuse 51 connected to earth, connected in series with the source of supply at the voltage VP by way of a first transistor 50 and a second transistor 63. The input ER to the transistor 50 is connected to the output ER from the comparator 5; consequently this transistor lets the current flow or not, depending upon the state of the output ER, that is to say, depending upon whether the confidential code is incorrect or correct. The input P to the transistor 63 is connected to the output from an AND-gate 70 the two inputs to which are connected to the outputs A0–A15 and CM1 of the decoder 8, the one, the output CM1, being connected by way of the inverter 72; consequently the transistor 63 lets the current flow as soon as the comparison of the confidential code ends, this being up to the end of the first cycle of the counter. The diode 52, the resistor 53 connected to the general supply VG, and the inverters 54, 55, have in combination with the fuse 51 a way of working identical with that of the initialization member 17 described in reference to FIG. 1e: as soon as the fuse 51 is destroyed a logical level 1 appears at the output FD. As this output FD is connected to the input FD to the zero-reset control member 15 (FIG. 1g) a positive level (that is to say, destruction of the fuse) lays down a permanent setting to zero of the addressing counter: the portable object is unusable for reading as well as for writing.

The simulation circuit 6 is composed of a resistor 61 connected to earth, connected in series with the source of supply at the voltage VP by way of a transistor 60 and the transistor 63 that has just been described. The input EX to the transistor 60 is connected to the output EX from the comparator 5, consequently it lets the current flow if the confidential code is correct. The resistor 61 is chosen of a value such that it lets a current flow of intensity equivalent to that of the current causing the destruction of the fuse 51.

It is possible to make use of the information "fuse 51 destroyed" in a different way, that is to say, a positive level at the output FD from the storage circuit, for example, this information might be used:
- to prohibit read-in (closing the gate 4) definitely and/or
- to prohibit read-out (closing the gate 3) definitely,
- to destroy the electronic circuits of the portable object by actuating the transfer device so that it delivers and applies to the portable object a current (or a voltage) of high value.

Other storage circuits 7 than those of the destructible-element type which has just been described may be used. In particular, by employing an erasable-store cell in accordance with MNOS or "ovonic" technology one can break away from incorporating into the portable object circuitry for power and for time division.

In fact, in the case of this variant embodiment the erasable store is charged electrically in the factory at the time of manufacture of the portable object, for example, at the time of the electronic operational tests or else at the time of the initialization operation; in order to keep track of an error in confidential code it is sufficient to discharge (short circuit) the store cell, This operation which consumes no energy is easier and quicker than that which consists in destroying a fuse. A logic associated with this erasable store comparable with that which has just been described will definitely prohibit the employment of the portable object or writing and/or reading when the store is erased.

The devices which have been described in reference to the preceding Figures exhibit the disadvantage of invalidating the portable object at the first error in confidential code; the result is that if the rightful owner of the portable object inadvertently composes a wrong number in all good faith, his portable object will in spite of everything be invalidated. In order to correct this disadvantage and to allow users the possibility of committing a few involuntary errors, whilst guaranteeing self-defence of the portable object against systematic attempts at fraud, the portable object that is now going to be described by referring to FIG. 3 includes a storage member capable of keeping count of the errors in confidential code committed; this storage member invalidates the portable object as soon as a certain previously fixed number of errors has been committed.

In FIG. 3 is illustrated a variant embodiment of a portable object all the storage members of which are composed of defined zones in the main store module. In the case of this variant embodiment the store 430 is organized in m.n words of 1 bit, for example, in 2048 words of 1 bit (at logical level 1 in the virgin state), it is addressed by an 11-stage counter 432 through an 11-way lock 431. The read-in of a bit is effected by giving a positive logical order at the read-in input 434 marked E; the inverter 435 connected to the lock 431 enables blocking of the address during the read-in operation. The contents (the bits) of the store is available at the conductor 436 connecting the output S from the store to the input-output of the portable object marked LIG; an AND-gate 468 is mounted in series with this conductor 436; this gate 468 has an input marked ALE.

A decoder member 433 is connected to the parallel outputs 437 from the addressing counter; it enables four zones to be detected in the store, the addresses of whch are, for example, the following:
Address 0 for the bit for the end of initialization;
Address 1 to 16 for the enabling data;
Address 17 to 32 for the zone for storage of the errors in confidential code;
Address 33 to 2047 for the storage zone proper for the data to be stored and transferred.

This decoder member is composed of four decoders 433a, 433b, 433c, 433d, programmed for detecting respectively the addresses 0, 16, 32 and 2047. The outputs A16, A32 and CM from each of these decoders are connected to the inputs A16, A32, CM to a programming member 480 intended to define the store zones described above. This programming member 480 is composed of two flip-flops 470 and 471; the flip-flop 470 is connected to the inputs A16 and A32 and to the input marked R1, its output 16–32 is activated (level 1) between the address 16 (and) the address 32 of the store; the flip-flop 471 is connected to the inputs A16 and CM to the programming member and to the input marked R1; the outputs 0–16 and 16–CM from the flip-flop 471 are respectively activated between the address 0 and the address 16 on the one hand and between the address 16 and the address 2047 on the other.

A two-stage counter 439 is connected to the output CM (maximum counting) from the decoder 433d; it is associated in series with a decoder 440 the outputs from which are marked C0, C1, C2; the gate 441 thanks to its inverter input enables stopping of the counter 439 when the output C2 is activated; these members enable the co-ordination of the different sequences of operation of the electronic circuits of the portable object; during the first cycle of the addressing counter 432 the output C0 is activated at the level 1, during the second cycle of the addressing counter 432 the output C1 is activated, during the third cycle of the addressing counter 432 the output C2 is activated, as well as during possible subsequent cycles. A comparator 442 is connected on the one hand to the output S from the store, and on the other hand to the input marked LIG to the portable object; it compares the confidential code introduced into the portable object by the input LIG with the enabling data contained in the addresses 1 to 16 of the store. In FIG. 3a is shown a detail view of this comparator; it is composed of an EXCLUSIVE-OR-gate 443, two AND-gates (444a) and (446a) connected respectively in series with the flip-flops 444-445 and 446-447. The inputs to the EXCLUSIVE-OR-gate 443 are marked S and ENTR, its output is connected to the AND-gate (444a); this AND-gate is in addition connected respectively to the outputs marked 0-16 and C1 from the programming member 480 and the decoder 440. The inputs to the AND-gate (446a) are connected on the one hand to the outputs marked A16 and C1 from the decoder 433 and from the decoder 440, and on the other hand to the output from the flip-flop 444. The flip-flops 444-445 and 446-447 are connected by their input R1 to the output R1 from the zero-reset circuit represented in FIG. 3c, which will be described below. The input C1 to the comparator enables it to be activated solely during the second cycle of operation of the counter 432. In the event of error in confidential code the output marked ER from the flip-flop 444-445 is established in a stable fashion at the logical level 1; on the other hand in the event of correct confidential code the output marked EX from the flip-flop 446-447 is established in a stable fashion at the level 1 at the time of the 17th clock pulse; that is, the input A16 to the comparator actuates it at the time of the 17th clock pulse. The input 0-16 and C1 to the comparator validate it during the 16 first addresses of the second cycle of the addressing counter 432.

The gate 448 connected to the output S from the store signals at its output P the first location available in the zone of the store, which is intending for counting the errors; this information is stored in the flip-flop R-S 449 and demultiplexed by the demultiplexer member composed of the gates 450 and 450a the inputs ER and EX to which are connected to the corresponding outputs from the comparator 442. Depending upon the result of the comparison carried out by the comparator 442 a level 1 is established at the output marked SI from the gate 450a in the case where the confidential code is correct; a level 1 is established at the output EE from the gate 450 in the case where the confidential code is incorrect. In FIG. 3b is illustrated a variant embodiment of the simulation member 451 connected to the output SI from the gate 450a; this simulation member is composed of a current interruptor 451a especially a transistor mounted in series with a resistor 451b of value such that the simulator current has an intensity comparable with that of the current necessary for destroying the fuse in the fuse store 430.

The output EE from the gate 450 is connected to the input to the OR-gate 452 the output E from which is connected to the input E to the store; consequently in the event of incorrect confidential code a read-in order is transmitted to the store and simultaneously the 11-way lock 431 locks the address of the first location available in the zone of the store reserved for counting the errors in confidential code.

The output C2 from the decoder 440 is connected to the input C2 to the flip-flop 449; the result is that the flip-flop 449 is reset to zero after one complete cycle of the addressing counter; in other words the order to stop read-in (or simulation) is given only at the expiry of a certain delay corresponding with about 2020 clock pulses.

In the case where the frequency limiter 453 is composed of a monostable of recockable type adjusted, for example, to a pulse width of 1 microsecond, the output signal from the flip-flop 449 will never have a duration less than 2.02 ms.

The member 454 for control of authorization of writing and/or reading is composed:
on the one hand, of an AND-gate 454a the inputs to which are respectively marked EX, 16-CM, C2 and connected to the corresponding outputs from the comparator 442, the programming member 480 and the decoder 440,
on the other hand, of an OR-gate 467 connected in series with the AND-gate 454a and one of the inputs to which, marked I, is connected to the output I from the initialization member 463 which will be described below. The output marked ALE of the member 454 for control of authorization of writing and/or reading is connected to the writing gate 455 and reading gate 468.

The member 454 delivers an authorization to read and/or write as its output ALE when simultaneously the confidential code being tested is correct (input EX), the phase of storage of the possible error has taken place (input C2), and the address of the bit does not belong to the prohibited secret zone of the store (input 16-CM); this authorization enables opening of the write gate 455 and read gate 463.

The zero-reset member 456 is connected by its output R1 to the inputs R1 to the counter 432, to the comparator 442, the initialization member 463 and the flip-flop 449. It will be described below in reference to FIG. 3c which shows a detail view of this member and of the circuit 459 for checking the read-in voltage VP.

The zero-reset member 456 is composed of an AND-gate 457 the inputs to which, marked S (the input S is an inverter input), CO, 16-32, CA, are connected respectively to the output S from the store, to the output CO from the decoder 440, to the output 16-32 from the programming member and to the output CA from the frequency limiter 453.

This AND-gate 457 is connected in series with a divider of frequency by 16, 458, the zero-reset input to which is marked R1; the frequency divider is in turn connected to an OR-gate the other input to which is marked R'1.

During the first cycle of the addressing counter the zero-reset member 456 activated by its input CO enables blocking of the electronic circuits of the portable object if the zone for storage of the errors in confidential code is entirely occupied; that is, in this case the divider of frequency by 16, connected to the output from the AND-gate 457 sends a pulse over the output R1 connected to the active sequential members of the portable object.

The circuit 459 for checking the read-in voltage VP, the output R1 from which is connected to the input R1 to the zero-reset member 456 generates a zero-reset pulse when the read-in voltage VP drops below a certain voltage. It is composed of a resistance-divider bridge 461 and an analogue comparator 460 which compares the read-in voltage VP with the general supply voltage VG. The output from the analogue comparator 460 is connected to the inverter input to an AND-gate 460b the other input to which is connected to the output PM from the flip-flop 449; the output from the AND-gate 460b is connected to the output R'1 from the member 459 by way of an OR-gate 462b; the result is that the zero-reset pulse over the output R'1 can appear only at the time of the read-in to store of the error in confidential code or of the simulation.

A starting capacitor 462 connected to the general voltage source VG sends a zero-reset pulse over the input to the OR-gate 462b at the time of putting the portable object under voltage.

The initialization member 463 is intended to enable the initial read-in of the enabling data. It is composed of an AND-gate 466 connected on the one hand to the output S from the store and on the other hand to the output AO from the decoder 433a; the output from the AND-gate 466 is connected to a flip-flop 464-465 the output from which is marked I; the output I from the initialization member 463 is connected to the inverter input to the AND-gate 448 and to the input to the OR-gate 467 of the member 454 for control of authorization of writing and/or reading. If a level 1 (signifying that the bit is virgin) appears over the output S from the store when the latter is addressed over its first address the output from the gate 466 forces to the level 1 the output I from the flip-flop 464-465; the result is on the one hand closure of the AND-gate 448, that is to say, prohibition of operation of the member for storage of the errors in confidential code and for simulation, and on the other hand opening of the gates 455 and 468 for authorization of writing and/or reading, by way of the OR-gate 467; read-in of the enabling data is consequently possible. After read-in of the enabling data it is advisable to disconnect the portable object from voltage and then to put in back under voltage by giving a positive order over the input LIG to the portable object; thus the bit located at the first address (address zero) of the store is destroyed; correlatively the gate 466 is definitely closed; the flip-flop 464-465 therefore from now on is put automatically to zero every time of putting under voltage since it is connected by its input R1 to the zero-reset member 456.

In order to check the validity of the confidential code being tested, the transfer device intended to be associated with the variant embodiment of the portable object in accordance with the invention which has just been described includes a generator of bursts (for example, 5000 pulses) the output of which is connected to the input H to the portable object; it includes in addition a flip-flop system connected over the output LIG from the portable object. If after 5000 pulses the flip-flop has not changed its state—thus expressing refusal to open by the gate 468—that signifies either that the confidential code being tested is incorrect, or that the zone for counting the errors in confidential code is saturated; in both cases the operations of transfer or processing of the data are refused, a signal may be provided on the transfer device to warn the rightful owner of the portable object about it.

I claim:

1. A portable independent electronic object designed for storing and transferring data confidentially, intended for being coupled to a data transfer device; the said portable object comprising:
   at least one store module intended for the storage of data in an easily portable form, containing enabling data,
   coupling means accessible from outside the portable object, enabling the said portable object to be coupled temporarily with the said transfer device,
   circuits for control of the store, interconnected between the coupling means and the store; the said store and the control circuits being produced in the form of logical microstructures;
   an identification comparator connected to the store and to the coupling means, intended for comparing the enabling data contained in the store with a confidential code supplied by the rightful owner of the portable object and introduced into the portable object by way of the said transfer device;
   the said portable object being characterized in that it includes in addition:
   a circuit for storage of the errors in confidential code, connected to the identification comparator, intended to keep track permanently of the errors in confidential code, the said storage circuit comprising at least one store element composed of a permanent store.

2. A portable object as in claim 1, characterized in that:
   the storage circuit comprises inhibition circuit means for inhibiting the electronic circuits of the portable object.

3. A portable object as in claim 2, characterized in that it comprises means for control of authorization of the access to the store module; the identification comparator actuating said means for control of authorization of the access to the store module.

4. A portable object as in claim 3, characterized in that:
   the means for control of authorization of the access to the store module actuates a writing gate.

5. A portable object as in claim 3, characterized in that:
   the means for control of authorization of the access to the store module actuates a reading gate.

6. A portable object as in claim 1, characterized in that:
   the store element of the storage circuit is a MNOS store.

7. A portable object as in claim 1, characterized in that:
   the store element of the storage circuit is an ovonic store.

8. A portable object as in claim 1, characterized in that:
   the store element of the storage circuit is a FAMOS store.

9. A portable object as in claim 1, characterized in that:
   the store element of the storage circuit is a destructible element.

10. A portable object as in claim 9, characterized in that:
    the destructible store element of the storage circuit is a fuse.

11. A portable object as in claim 9, characterized in that it includes in addition:
    a simulation circuit connected in parallel with the storage circuit over the supply.

12. A portable object as in claim 10, characterized in that it includes in addition:
    a circuit means for checking the supply voltage to the storage circuit.

13. A portable object as in claim 12, characterized in that:
    the circuit means for checking the supply voltage is connected to an inhibiting circuit for inhibiting the electronic circuits of the portable object.

14. A portable object as in claim 12, characterized in that:
    the circuit means for checking the supply voltage comprises an analogue comparator.

15. A portable object as in claim 3, characterized in that it includes in addition:

an initialization circuit connected to the means for control of authorization of the access means.

16. A portable object as in claim 15, characterized in that:

the initialization circuit comprises a store element.

17. A portable object as in claim 16, characterized in that:

the store element of the initialization circuit is destructible, whereby the said destructible store element is definitely destroyed after writing enabling data into the store module.

18. A portable object as in claim 17, characterized in that:

the destructible store element of the initialization circuit is a fuse.

19. A portable object as in claim 1, characterized in that:

the storage circuit includes a plurality of store elements capable of receiving each the track of an error in confidential code.

20. A portable object as in claim 19, characterized in that:

the storage circuit is associated with a virgin-address director means for detecting a virgin store element capable of storing an error in confidential code.

21. A portable object as in claim 19, characterized in that:

the storage circuit is associated with a counting and inhibition circuit having means for:

counting the number of errors in confidential code committed and recorded in the storage circuit and means for delivering an inhibition signal when the number of errors committed reaches a predetermined threshold.

22. A portable object as in claim 21, characterized in that:

the counting and inhibition circuit comprises a divider connected to the reading output from the store elements of the storage circuit.

23. A portable object as in claim 21, characterized in that:

each store element of the storage circuit consists of a store element of the store module.

24. A portable object as in claim 16, characterized in that:

the store element of the initialization circuit is one of the store elements of the store module.

25. A portable object as in claim 1, characterized in that it includes in addition:

a frequency limiter connected to an addressing counter connected to the store module.

26. A portable object as in claim 1, characterized in that it comprises means for control of authorization of the access to the store module; the identification comparator actuating said means for control of authorization of the access to the store module.

27. A portable object as in claim 19, characterized in that:

each store element of the storage circuit consists of a store element of the store module.

* * * * *